United States Patent
Poder et al.

(10) Patent No.: US 7,802,822 B2
(45) Date of Patent: Sep. 28, 2010

(54) COUPLING WITH AN INDICATOR

(75) Inventors: Philippe Poder, Guichen (FR); Philippe Blivet, Rennes (FR)

(73) Assignee: Legris SAS, Rennes (FR)

( * ) Notice: Subject to any disclaimer, the term of this patent is extended or adjusted under 35 U.S.C. 154(b) by 0 days.

(21) Appl. No.: 12/688,424

(22) Filed: Jan. 15, 2010

(65) Prior Publication Data

US 2010/0127492 A1    May 27, 2010

Related U.S. Application Data

(63) Continuation of application No. PCT/FR2008/001040, filed on Jul. 16, 2008.

(51) Int. Cl.
*F16L 35/00* (2006.01)
(52) U.S. Cl. .......................................... 285/93; 285/317
(58) Field of Classification Search ................... 285/93, 285/308, 317
See application file for complete search history.

(56) References Cited

U.S. PATENT DOCUMENTS

| | | | | |
|---|---|---|---|---|
| 5,863,077 A | * | 1/1999 | Szabo et al. | ................... 285/93 |
| 6,082,779 A | * | 7/2000 | Lesser et al. | ................... 285/93 |
| 6,089,616 A | * | 7/2000 | Trede et al. | ................... 285/93 |
| 6,722,703 B2 | | 4/2004 | Takayanagi et al. | |
| 6,851,721 B2 | * | 2/2005 | Poder | ........................... 285/93 |
| 7,316,425 B2 | | 1/2008 | Poder | |

FOREIGN PATENT DOCUMENTS

| | | |
|---|---|---|
| DE | 19708377 C1 | 6/1998 |
| EP | 0 712 473 B1 | 12/1999 |
| EP | 0 901 592 B1 | 7/2002 |
| EP | 0 959 290 B1 | 10/2002 |
| EP | 1 734 299 A2 | 12/2006 |
| FR | 2705430 | 11/1994 |

* cited by examiner

*Primary Examiner*—David E Bochna
(74) *Attorney, Agent, or Firm*—John A. Molnar, Jr.

(57) ABSTRACT

A quick connector including a female part, a male part, and a latch. The latch includes a latching ring which slides within a housing of the female part, and a backing ring which is fitted on the latching ring and is slidable relative thereto. As the male part is inserted into the female part, the latching ring locks the parts and a folded tab of the backing ring is raised to provide a visual indication that male part is locked in the female part.

6 Claims, 3 Drawing Sheets

000
COUPLING WITH AN INDICATOR

CROSS-REFERENCE TO RELATED APPLICATIONS

This application is continuation of co-pending International Application No. PCT/FR2008/001040 filed Jul. 16, 2008, which designated the United States, and which claims priority to French Patent Application 0705418, filed Jul. 25, 2007, the disclosure of each of which is expressly incorporated herein by reference.

BACKGROUND OF THE INVENTION

The present invention relates to a connector with an indicator, and more precisely to a connector also known as a "quick" connector or coupling.

Certain automobile equipment manufacturers require ways for ensuring that fuel lines are properly installed, in particular to prevent the risk of couplings being incompletely connected.

Thus, certain type couplings that are locked manually typically employ U-shaped clips that enable the user to lock the coupling halves only when one halve is properly in place in the other.

Quick couplings, however, lock automatically. It thus is required that the coupling itself indicates that the connection has been properly made. For this purpose, an indicator part is used that may be ejected or extracted from the coupling at the end of connection.

Such couplings with indicators are shown, for example, in EP 712473; EP 959290; and EP 901592, relating to ejectable indicator parts, and in U.S. Pat. No. 6,722,703 and EP 1734299 relating to indicator parts that are extractable.

These solutions may not be ideal as involving a waste management issue for the user. Such solutions also run the risk that indicator part may be lost or forgotten in the engine compartment of a vehicle where it may give rise to noise or may even melt and foul the engine even before the vehicle is sold.

In addition, the indicator function of such couplings is disable after the first use such that when a second connection is performed later, such as during a maintenance operation that requires disconnection, any subsequent connection no longer benefits from this indicator function as the indicator part has been separated from the coupling on the first occasion that is it used.

U.S. Pat. No. 7,316,425 describes a coupling with an indicator in which the indicator is not separable from the components of the coupling, and in particular from the locking member. Nevertheless, this coupling requires an action to be performed by the operator.

Thus, there is believed to exist a need for a quick coupling that incorporates a function of automatically signaling proper connection, and which function is permanent, inseparable from the components of the coupling itself so as to be reusable after disconnection, and constitutes a mark that is visually highly contrasted relative to the other components of the coupling.

SUMMARY OF THE INVENTION

The present invention is directed to a quick connector with an indicator. The connector includes:
 a female part having a staged bore with a section of larger diameter;
 a male part having a collar; and
 a latch which may be in the form of a ring mounted to slide radially in a housing formed in the female part.

With the larger diameter section of the female part being capable of receiving the outer collar of the male part of the connector beyond the latch ring, the latch ring is movable against a resilient return member between a stable, first position for locking where its opening for passing the collar is off-center relative to the axis of the large-diameter section of the bore, and an unstable, second position where the opening is substantially coaxial with the section of such bore.

The latch ring is fitted on its rear face with a backing ring possessing an opening of the same diameter as the opening in the latch ring. The backing ring is free to slide relative to the latch ring parallel to the sliding direction thereof in the female part. The backing ring is held relative to the latch ring in a position in which the two openings lie on a common axis by means of at least one tab that is folded onto the visible surface portion of the latch ring, with movement of the latch ring relative to the backing ring from such position causing the tab to be stood up at the surface of the latch ring.

This arrangement has several advantages. One lies in the fact that the length of the tab can be considerable, and its movement that results from the ring moving relative to the backing ring, even by only a small amount, is constituted by a tilting movement so that the tab stood up at the surface of the latch ring, and thus at the outside surface of the coupling, constitutes a kind of small flag (the indicator) that is of dimensions that are not negligible, and providing it is of a bright color or strongly contrasted with the color of the body of the coupling, it provides a clear indication of the (good) state of the connection that has been made. Another advantage lies in the fact that the indicator is held captive and therefore does not constitute waste.

With the invention, when the coupling is not achieved, the folding down of the tab against the above-mentioned surface portion of the latch ring causes the backing ring to be recentered relative to the latch ring. This provides an indicator that is reusable or that can be initialized.

In an embodiment of the invention, the backing ring has two tabs suitable for folding down on the visible surface of the latch ring, with the tabs moving as mirror images of each other.

In another embodiment, the tab can be folded down is a single tongue, and its movement is contained substantially in a plane perpendicular to the axis of the staged bore.

For reasons of appearance, it is advantageous for the visible surface of the latch ring to include housings for receiving the above-mentioned tab(s).

The invention thus seeks to provide a coupling similar in particular to the coupling described in document FR-A-2705430, but with a member for signaling the state of its connection, which member is captive and highly visible in each of its two states.

The present invention, accordingly, comprises the construction, combination of elements, and/or arrangement of parts and steps which are exemplified in the detailed disclosure to follow.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
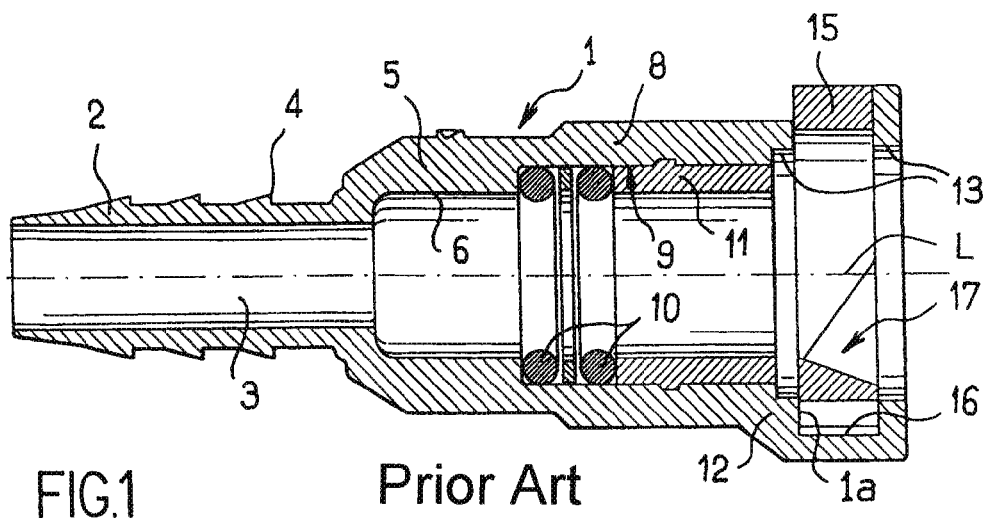
FIG. 1 is an axial section view of the female part of a connector in accordance with the state of the art as shown in FR-A-2705430.

With reference to FIG. 1, a connector of the invention comprises, in known manner, a female part 1 that is subdivided into a plurality of sections along a central longitudinal axis, L. A first section 2 possesses an internal channel 3 and external means 4 forming a serrated spigot for insertion into a tube (not shown). The second section 5 of the part 1 has a bore 6 of diameter designed to receive the nose of an endpiece 7 (FIG. 4) that forms the male part of the connector.

Figure 4:
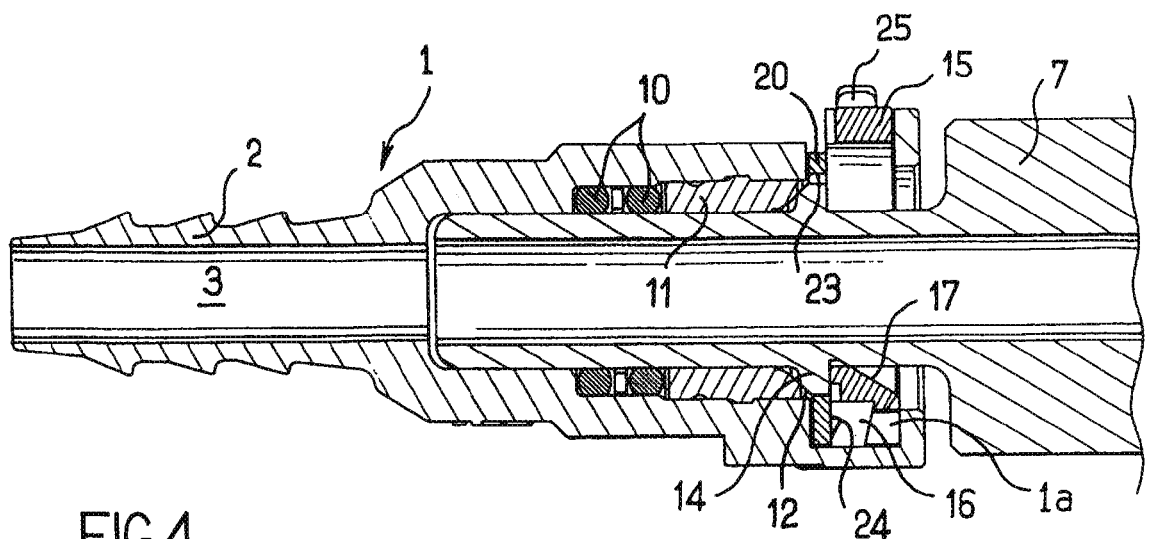
FIG. 4 is a section view of the connector of the invention indicating a good connection.

The third section 8 of the female part 1 has a bore 9 of diameter larger than that of the bore 6 in order to receive two O-rings 10 and an insert 11 for blocking them. The inside diameter of the insert is equal to the diameter of the bore 6. Finally, the female part 1 has a third section 12 has a bore 13 of an inside diameter that is still greater than that of the preceding bore so as to be capable of freely passing a collar 14 carried by the endpiece 7 (FIG. 4). At its end open to the outside, the last section 12 of the female part 1 has a latch for preventing the endpiece 7 being extracted once it has been properly inserted in the female part 1. This latch is constituted by a ring 15 capable of sliding radially in the female part 1 in an open housing 1a formed therein, and it has two outer resilient spring legs, commonly referenced at 16, that tend to shift the axis of the bore inside the ring 15 relative to the bore 13. The portion of this bore inside the ring 15 situated beside the legs 16 is in the form of a conical surface 17 with the apex of the cone situated beside the other sections of the bore, such that when the collar 14 goes past, such surface forms a ramp for realigning the axes of the bore in the ring 15 and of the bore 13 in the part 1. The ring 15 can then move against the effect of the resilient spring legs 16 until the collar 14 is received in the bore 13 beyond the ring 15.

The legs 16 then relax and the ring 15 returns to its free position that is off-center relative to the bore 13, and one of its flanks comes into contact with the rear flank of the collar 14 and constitutes an abutment opposing extraction of the endpiece 7.

Figure 2:
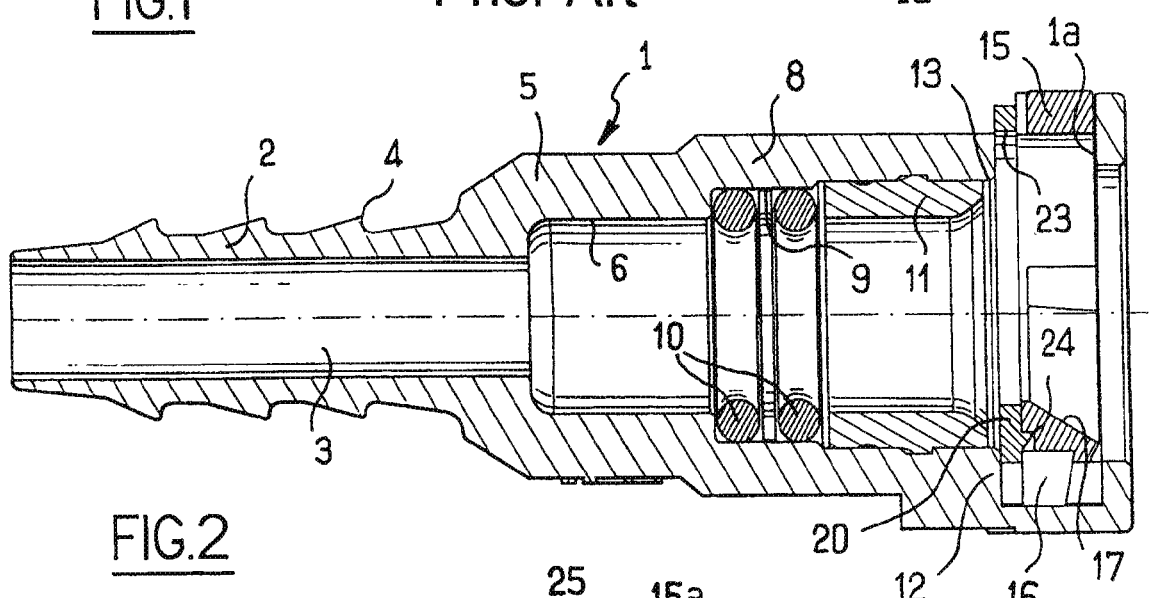
FIG. 2 is an axial section view of the female part of a FIG. 1 connector fitted with the indicator in accordance with the invention.
Figure 3:
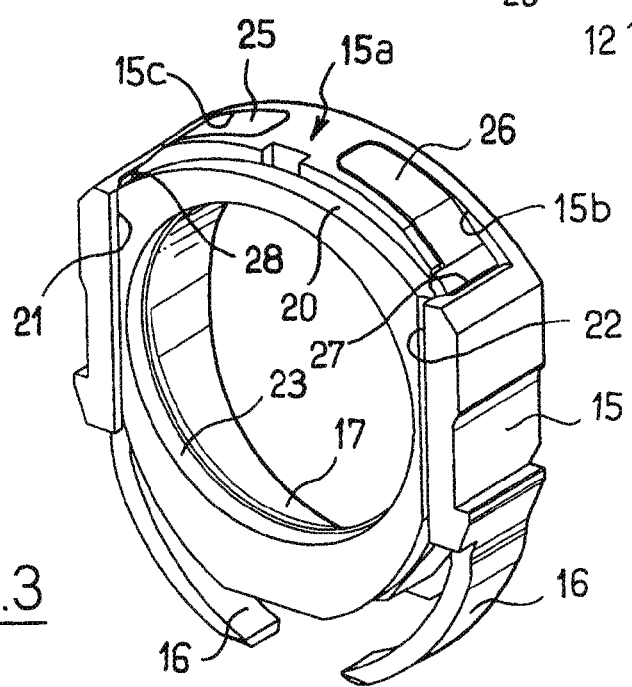
FIG. 3 is an outside view of the latch ring associated with the backing ring.

FIGS. 2 and 3 show the dispositions that are specific to one embodiment of the invention. In FIG. 2, the housing 1a for the ring 15 is shown to also receive a backing ring 20. With reference to FIG. 3, backing ring 20 is mounted in slideways 21 and 22 on the ring 15, running along its face that faces towards the bore 12 (FIG. 2). The backing ring 20 possesses an opening 23 of the same diameter as the opening of the ring 15. This opening 23 is held on the axis of the ring 15 by a hook 24 (FIG. 2) that upwardly limits movement of the backing ring 20 relative to the ring 15, and by two tabs 25 and 26 forming parts of the backing ring, being connected thereto by bridges 27 and 28 that are flexible and of very small dimensions such that the tabs 25 and 26 constitute fasteners for fastening the backing ring to the ring when the tabs are pressed down against the uncovered portion of the outside surface 15a of the ring 15.

More precisely, the ring 15 includes setbacks or housings 15b and 15c in the surface 15a, into which the tabs 25 and 26 can be placed. In this state, as shown in FIG. 3, the tabs 25 and 26 hold the backing ring against any tendency to slide downwards, i.e. towards the resilient spring legs 16. The retention force can be overcome by causing the backing ring 20 to slide downwards under a force that is smaller than that developed by the spring legs 16 on the ring 15. In this movement, the tabs escape from their housings and are raised so as to penetrate somewhat into side slots in the ring 15 along the slideways 21 and 22. In this state, the tabs 25 and 26 clearly project out from the body of the first part 1 (FIG. 2) of the connector like small, upwardly-extending flags. Such projections of the tabs 25 and 26 then constitute an indication that the backing ring 20 is offset downwards relative to the ring 15.

The dimensions of each of the tabs 25 and 26 may be designed to be large so that the relative movement of the ring and the backing ring through about one or two millimeters becomes transformed into a movement of much greater amplitude and results in projections from the female part 1 of the connection that are of a size that is much greater than the value of the amplitude of the movement that gives rise to their existence. These "flags" can then easily be identified by optical inspection equipment, such as cameras.

Figure 5:
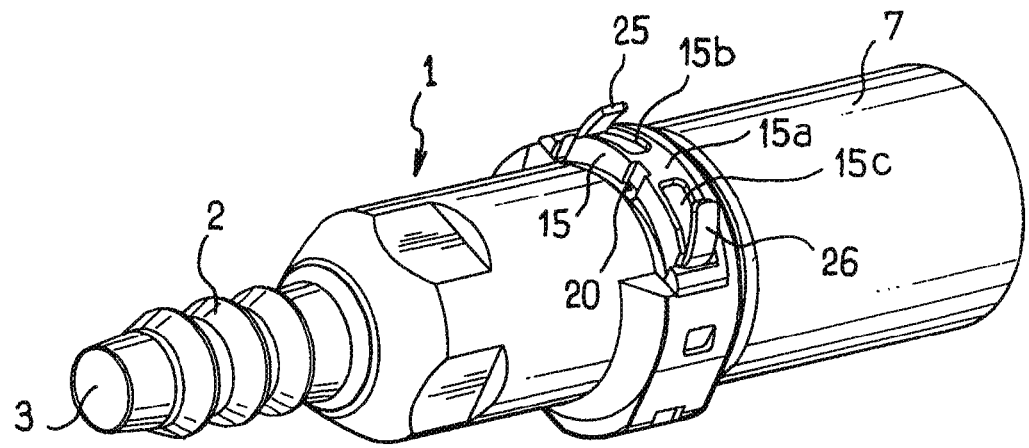
FIG. 5 is an outside view of FIG. 4.

This condition is shown in FIGS. 4 and 5, where the connector formed by the coupling of the female part 1 and the male endpiece 7 male part is shown in service. The male endpiece 7 is received inside the female part 1 of the connector and is pushed in, as may be seen in FIG. 4, far enough for the collar 14 to be located beyond the ring 15. The extent to which endpiece 7 can be pushed in is limited by the insert 11 retaining the O-rings, which insert 11, unlike in FIG. 1, occupies practically all of the bore 13. When in abutment in this way, the collar 14 lies in the opening 23 of the backing ring 20, which is of diameter that is slightly greater than that of the collar 14. Under the effect of the spring legs 16, the ring 15 is raised, while the backing ring 20 is held down where it was entrained by the ring 15 by means of the hooks 24 when the collar 14 was passing through the ring 15, with the collar pushing it downwards by acting on the ramp 17. The rise of the ring 15 causes the tabs 25 and 26 to be stood up out from their housings 15b and 15c, raising them as flags, as explained above. The ring 15, raised behind the collar 14, then does indeed act as a latch.

If the operator desires to disconnect the connector, the operator presses on the surface 15a (FIG. 5) of the ring 15. The collar 14 can then pass back through the latch ring 15 and the connector is disassembled. The operator can then put the tabs 25 and 26 back into the housings 15b and 15c. The indicator is thus cocked or reinitialized, ready to perform its function once more on the next connection.

Figure 6:
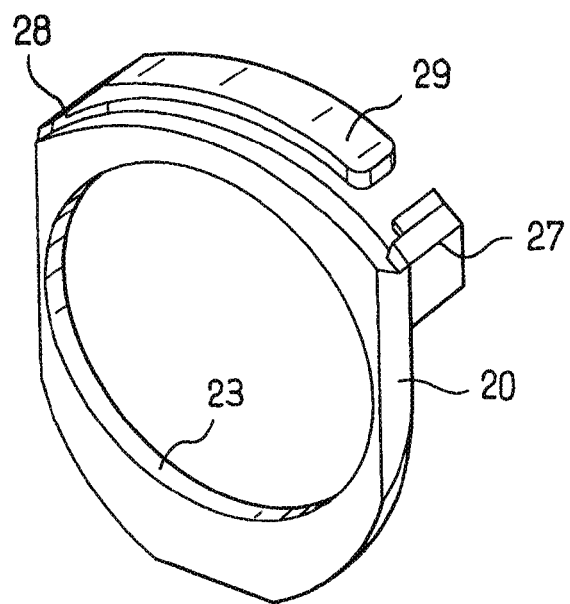
FIG. 6 is an outside view of a variant embodiment of the backing ring of the invention.

FIG. 6 shows a variant embodiment of the backing ring 20 in which the two tabs 25 and 26 (FIG. 3) are replaced by a single, longer tab 29 that therefore projects further from the body of the connector when it is stood up by the relative off-centering of the two rings 15 (FIG. 3) and 20.

Figure 7:
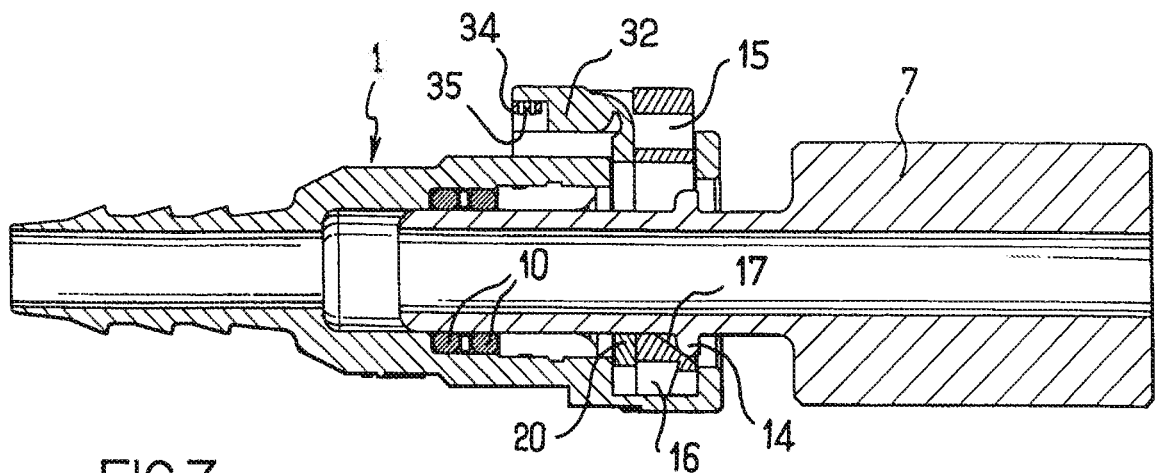
FIG. 7 is a section view of another embodiment of the connector of the invention.
Figure 8:
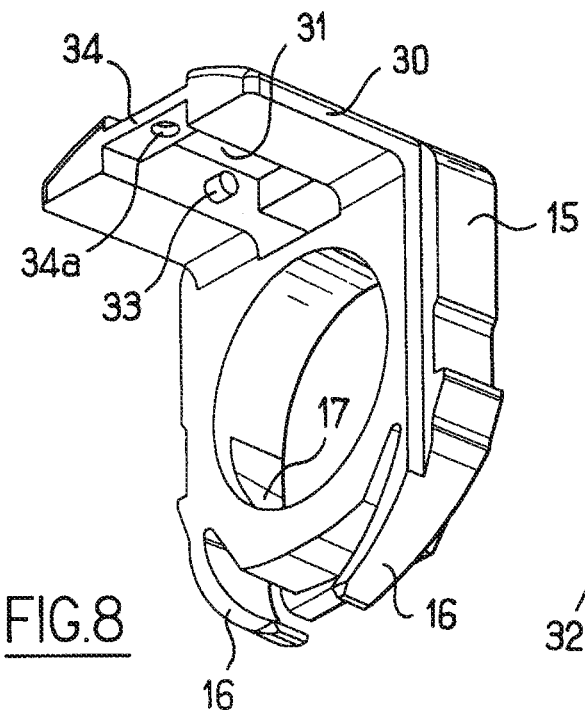
FIG. 8 is an outside view of the latch ring implemented in FIG. 7.
Figure 9:
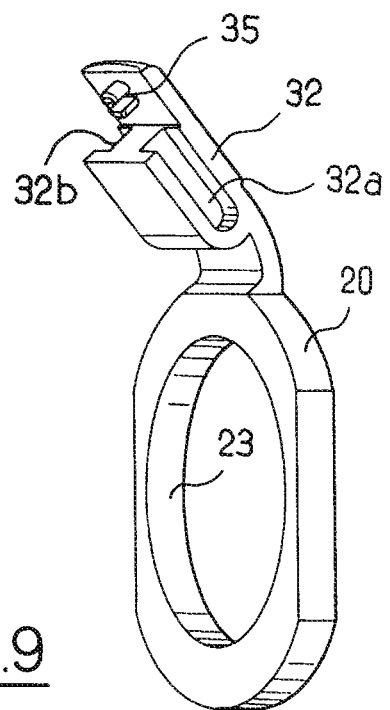
FIG. 9 is an outside view showing the backing ring implemented in FIG. 4.

In FIG. 7, the connector that is shown in section possesses a ring 15 shown in an outside view in FIG. 8, and also a backing ring 20, shown in an outside view in FIG. 9.

The ring 15 is provided with a top plate 30 that serves as a disconnection pusher. This substantially horizontal plate possesses a central recess 31 for passing a tongue 32 that is hinged to the top of the backing ring 20, which ring does not have a hook 24 in this embodiment.

The tongue 32 has two grooves 32a and 32b that laterally engage two respective pegs 33 provided on the flanks of the opening 31 which forms the branches of a yoke between which the tongue 32 can slide and tilt during relative movement between the ring and the backing ring. Between the branches, at their end, a cross-member 34 is provided with an orifice 34a for receiving a split centering button 35 at the end of the tongue 32. As above, this relative movement results in the ring 15 rising while the backing ring 20 is blocked by the collar 14. The pegs 33 rise, acting on the flanks of the grooves 32a and 32b so as to raise the tongue 32 with its button 35 escaping from the orifice 34a. The tongue 32 then stands up and projects relative to the outside surface of the connector so as to form an indicator of its activated state. Unlike the tabs 25, 26 (FIG. 3), and 29 (FIG. 6) that pivot substantially about axes that are parallel to the axis of the bore 13 (FIG. 1), the tongue 32 pivots about an axis that is perpendicular to that direction. As above, the indicator tongue 32 may be reinitialized after disconnection.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A connector comprising:
   a female part having a bore extending therethrough along a longitudinal axis, the bore having an opening, a housing portion adjacent the opening having a slot, and a first section adjacent the housing portion having a first inner diameter, the housing portion having a second inner diameter larger than the first inner diameter;
   a male part insertable coaxially through the opening into the female part, the male part having a forward distal end receivable in the first section of the female part and a rearward collar receivable in the housing portion of the female part;
   a latch received in the housing portion through the slot, the latch comprising:
      a latching ring having an axial first face adjacent the opening, an axial second face opposite the first face, and a radial outside surface between the first face and the second, a visible portion of the outside surface being visible through the slot, the latching ring being slidably movable radially in the housing portion from a normally-biased locking position disposed eccentric to the opening in the bore and an open position disposed concentric with the opening in the bore; and
      a backing ring fitted on the second face of the latching ring, the backing ring being slidably movable radially in the housing portion relative to the latching ring between a first position wherein the backing ring is disposed concentric with the latching ring in the locking position thereof, and a second position wherein the backing ring is disposed eccentric to the latching ring in the locking position thereof, and the backing ring having at least one tab foldably movable between a flat position wherein the tab in the first position of the backing ring is disposed generally coterminous with the visible portion of latching ring and a raised position wherein the tab in the second position of the latching ring extends outwardly relative to the visible portion of the latching ring,
   wherein with the tab being disposed in its flat position, as the male part is inserted into the female part, the latching ring is urged from its locked position to its open position allowing the collar of the male part to pass therethrough, and thereupon as the forward distal end of the male part is advanced into the first section of the female part, the latching ring returns to its normally-biased locking position delimiting the removal of the male part out of the female part, and
   wherein as the forward distal end of the male part is received in the first section of the female part, the backing ring is urged from its first position to its second position with the tab thereupon moving from its flat position to its raised position providing a visual indication that male part is locked in the female part.

2. The connector of claim 1 wherein with the male part being removed from the female part, the tab is foldable back into its flat position with the backing ring being drawn thereby back into its first position.

3. The connector of claim 1 wherein the backing ring has a first and a second said tab, each of said first and said second said tab being hinged to the backing ring on opposite sides thereof.

4. The connector of claim 1 wherein the tab is foldably movable in a plane generally parallel to the longitudinal axis of the bore.

5. The connector of claim 1 wherein the tab is foldably movable in a plane generally perpendicular to the longitudinal axis of the bore.

6. The connector of claim 1 wherein the visible portion of the latching ring has a housing for receiving the tab when disposed in its flat position.

* * * * *